United States Patent [19]
Krishnakumar et al.

[11] Patent Number: 5,637,167
[45] Date of Patent: Jun. 10, 1997

[54] METHOD FOR POST-MOLD ATTACHMENT OF A HANDLE TO A STRAIN-ORIENTED PLASTIC CONTAINER

[75] Inventors: Suppayan M. Krishnakumar, Nashua; Wayne N. Collette, Merrimack; David Piccioli, Auburn, all of N.H.

[73] Assignee: Continental PET Technologies, Inc., Florence, Ky.

[21] Appl. No.: 447,119

[22] Filed: May 22, 1995

[51] Int. Cl.⁶ .................................................. B29C 49/20
[52] U.S. Cl. ......................... 156/85; 29/447; 264/450; 264/457; 264/513; 264/516
[58] Field of Search ......................... 264/513, 515, 264/516, 534, 230, 342 R, 906, 909, 450, 457; 29/421.1, 447, 453; 215/396; 220/770

[56] References Cited

U.S. PATENT DOCUMENTS

| | | |
|---|---|---|
| 3,764,644 | 10/1973 | Robinson . |
| 3,910,448 | 10/1975 | Evans et al. ............................ 220/3.8 |
| 4,044,092 | 8/1977 | Spears . |
| 4,207,284 | 6/1980 | Speas . |
| 4,257,525 | 3/1981 | Thompson . |
| 4,260,567 | 4/1981 | Poppe et al. ............................ 264/904 |
| 4,273,246 | 6/1981 | Thompson . |
| 4,280,859 | 7/1981 | Thompson . |
| 4,281,770 | 8/1981 | Rainville . |
| 4,363,415 | 12/1982 | Rainville . |
| 4,368,826 | 1/1983 | Thompson . |
| 4,368,827 | 1/1983 | Thompson . |
| 4,372,454 | 2/1983 | Thompson . |
| 4,385,089 | 5/1983 | Bonnebat et al. ....................... 264/523 |
| 4,482,518 | 11/1984 | Brady, Jr. ............................ 264/909 |
| 4,512,948 | 4/1985 | Jabarin ............................... 264/523 |
| 4,604,044 | 8/1986 | Hafele . |
| 4,629,598 | 12/1986 | Thompson . |
| 4,863,046 | 9/1989 | Collette et al. . |
| 4,915,241 | 4/1990 | Moimura et al. . |
| 4,952,133 | 8/1990 | Hasegawa et al. . |
| 4,964,522 | 10/1990 | Umetsu et al. . |
| 4,983,116 | 1/1991 | Koga . |
| 5,057,266 | 10/1991 | Belcher . |
| 5,122,327 | 6/1992 | Spina et al. ........................... 264/534 |
| 5,167,970 | 12/1992 | Yoshino et al. . |
| 5,338,503 | 8/1994 | Yanagisawa et al. .................... 264/513 |
| 5,469,612 | 11/1995 | Collette et al. ........................ 29/453 |

FOREIGN PATENT DOCUMENTS

| | | |
|---|---|---|
| 220099 | 11/1957 | Australia . |
| 0201922 | 11/1986 | European Pat. Off. . |
| 0650900A1 | 5/1995 | European Pat. Off. . |
| 1237243 | 6/1960 | France . |
| 2680720 | 3/1993 | France . |
| 57-201632 | 12/1982 | Japan . |
| 4-6043 | 1/1992 | Japan . |
| 4-52125 | 2/1992 | Japan ................................. 264/516 |
| 8105605 | 1/1983 | Netherlands . |
| 652054 | 4/1951 | United Kingdom . |
| 1570816 | 7/1980 | United Kingdom . |
| 2251844 | 7/1992 | United Kingdom . |
| 2255546 | 11/1992 | United Kingdom . |
| WO82/02370 | 7/1982 | WIPO . |
| WO95/15250 | 6/1995 | WIPO . |

*Primary Examiner*—Catherine Timm
*Attorney, Agent, or Firm*—Wolf, Greenfield & Sacks, P.C.

[57] ABSTRACT

A method for post-mold attachment of a handle to a strain-oriented plastic container body. The method utilizes thermal shrinkage of the oriented container body to engage the handle; for example, a highly-oriented recess is molded in the container body and then shrunk to engage a complimentary-shaped lug on the handle. The method is useful for both hot-fillable and pasteurizable containers, and is particularly useful for making larger-sized containers, wherein the weight of the product and size of the container make handling and pouring difficult.

36 Claims, 13 Drawing Sheets

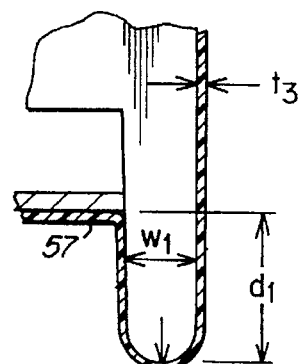
Fig. 3A
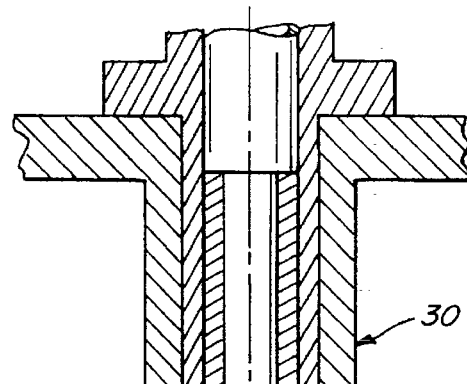
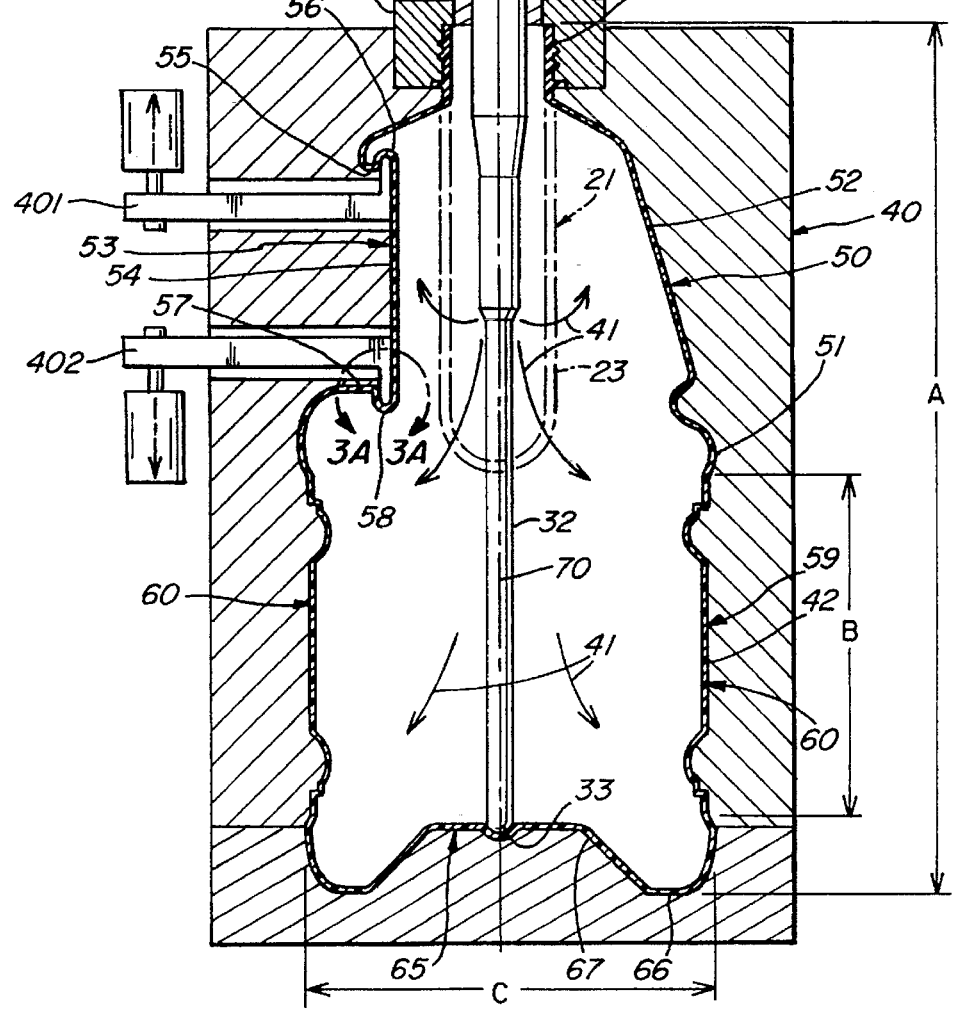
Fig. 3B
Fig. 3

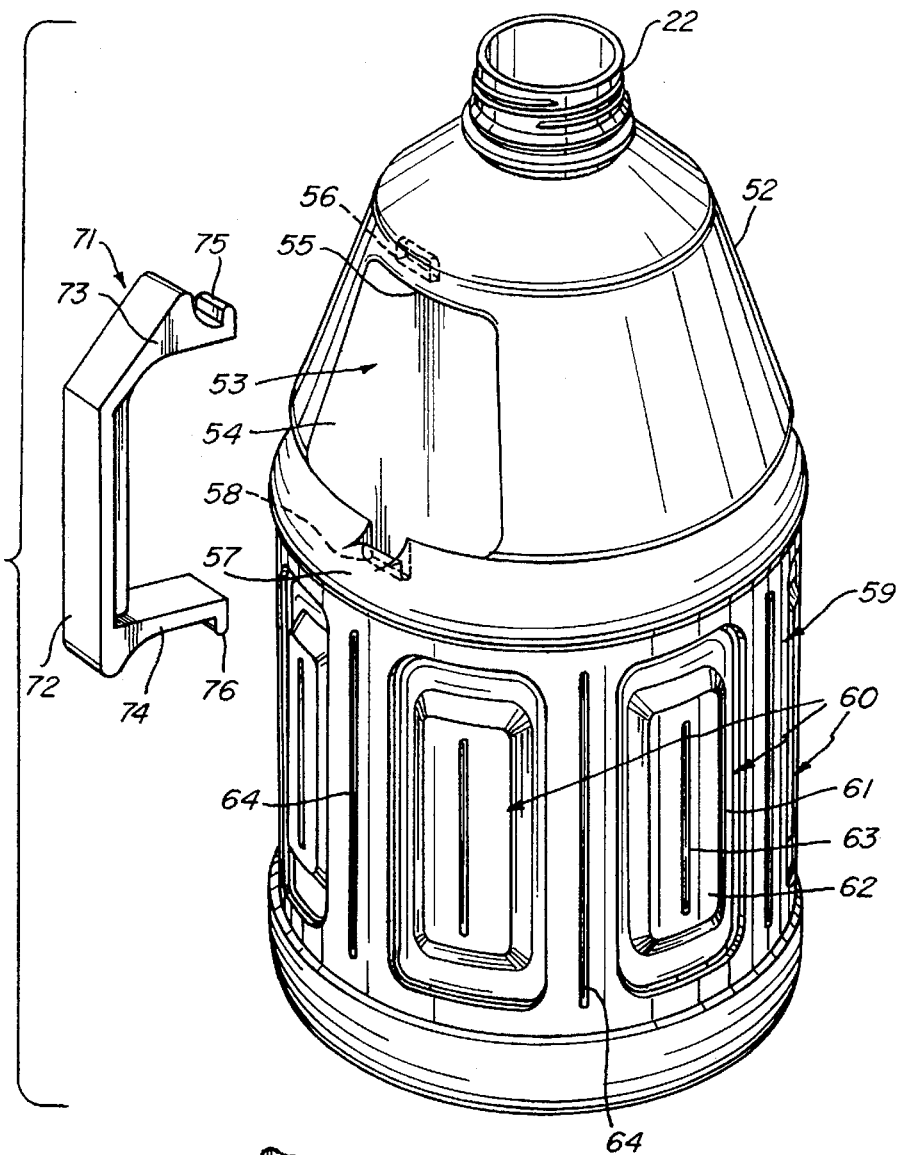
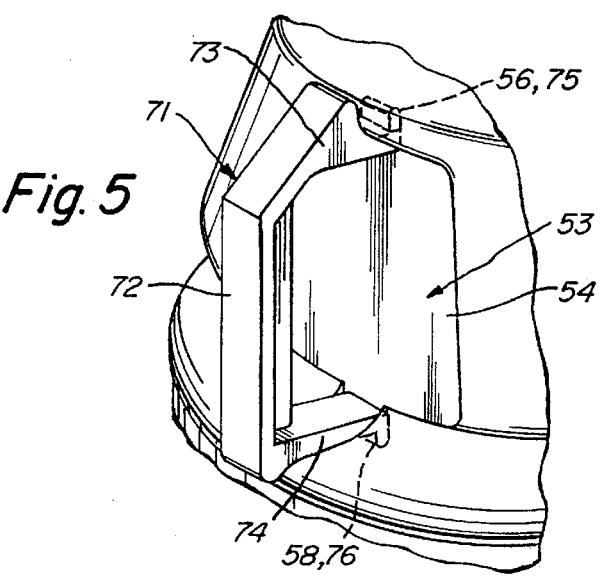

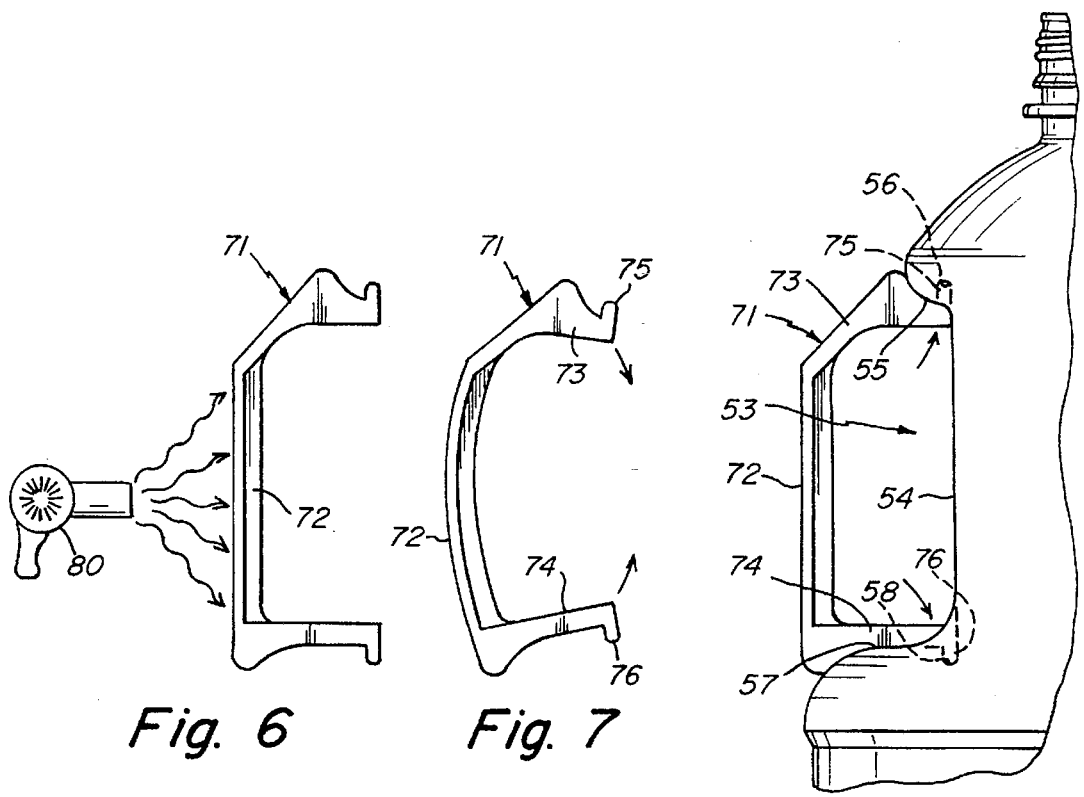
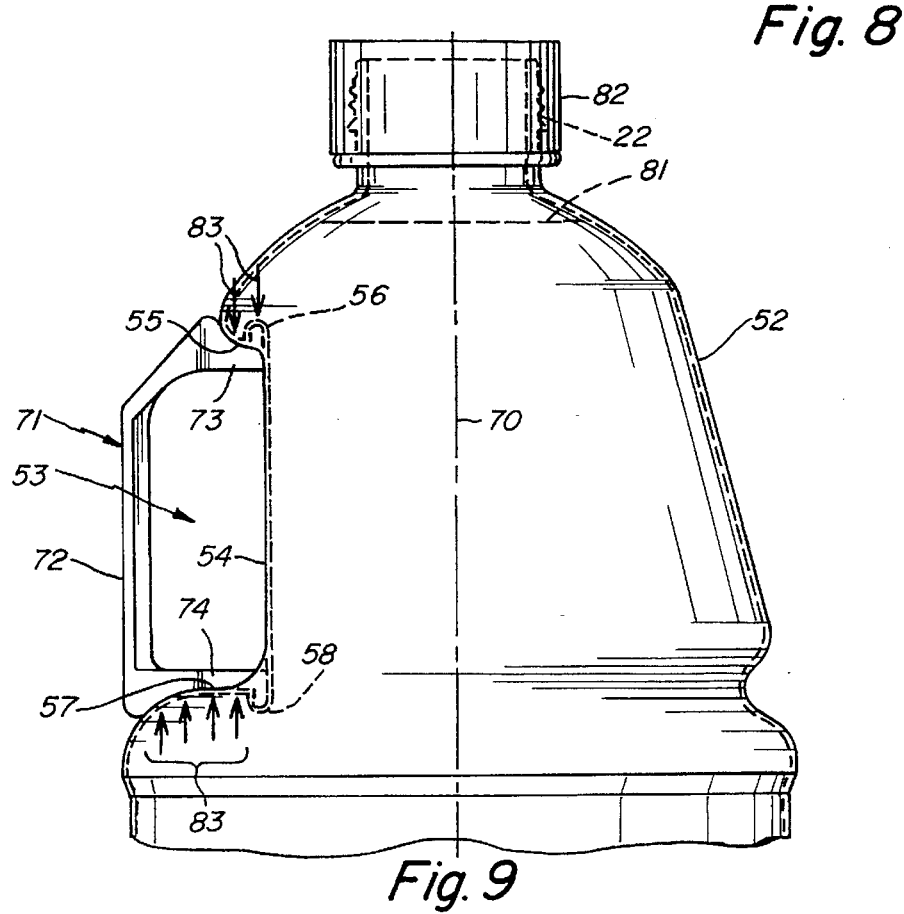

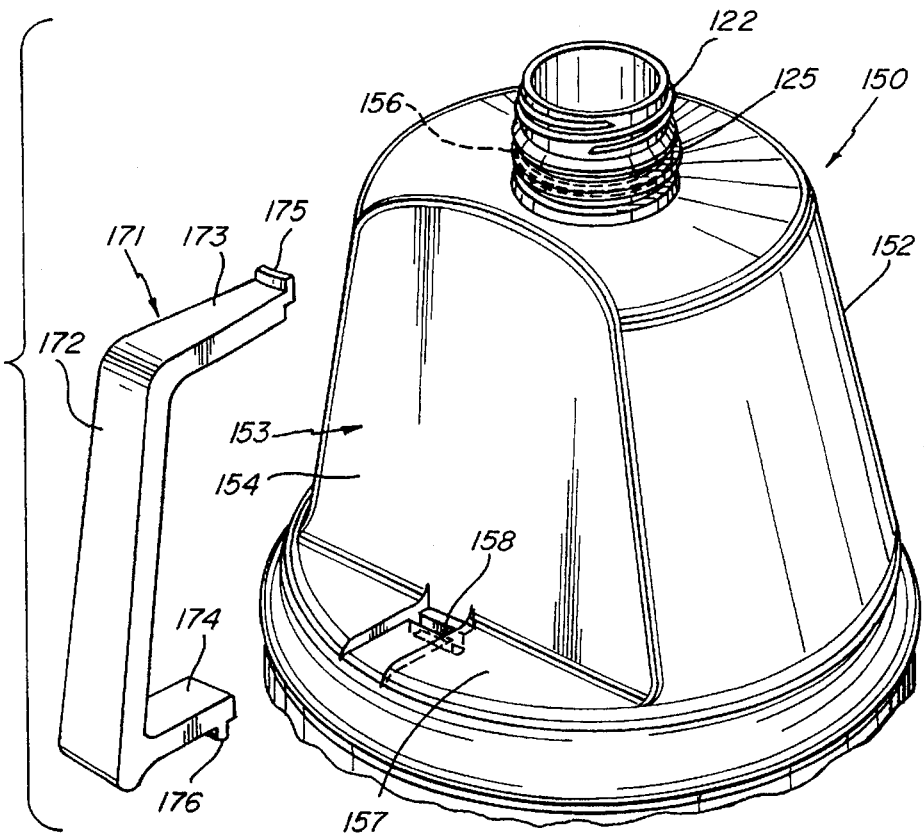
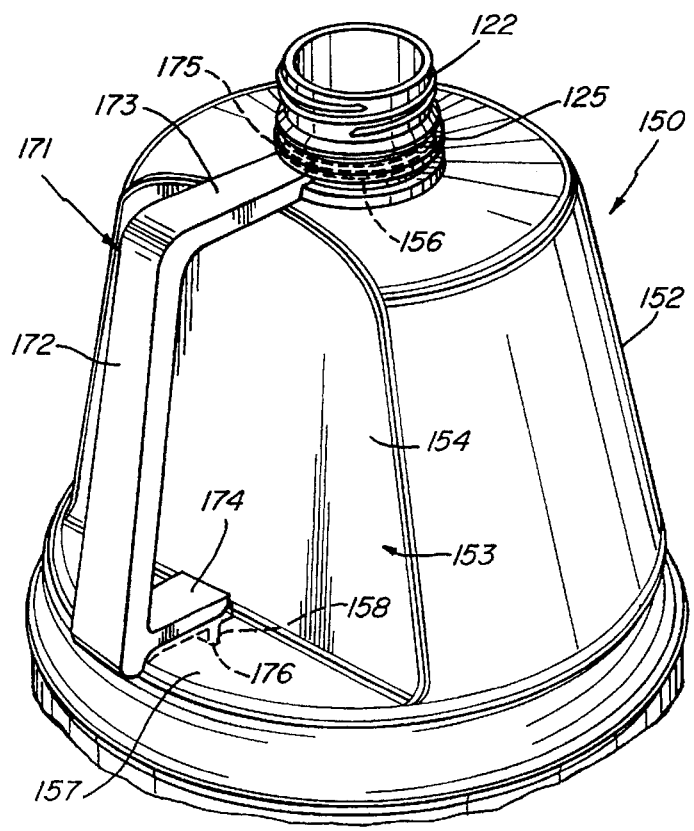

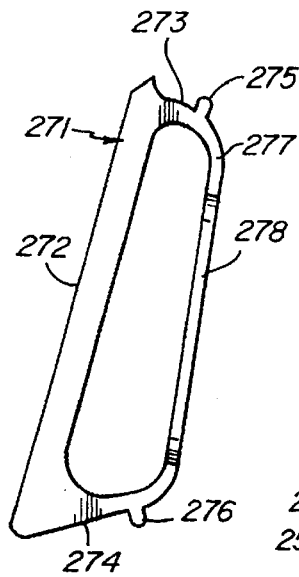
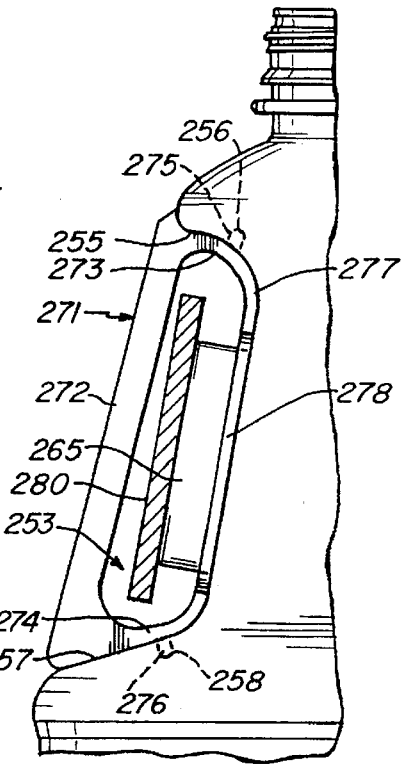
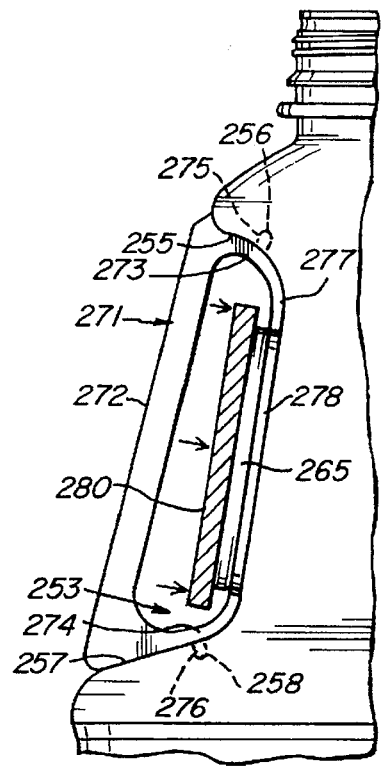
Fig. 18   Fig. 19   Fig. 20
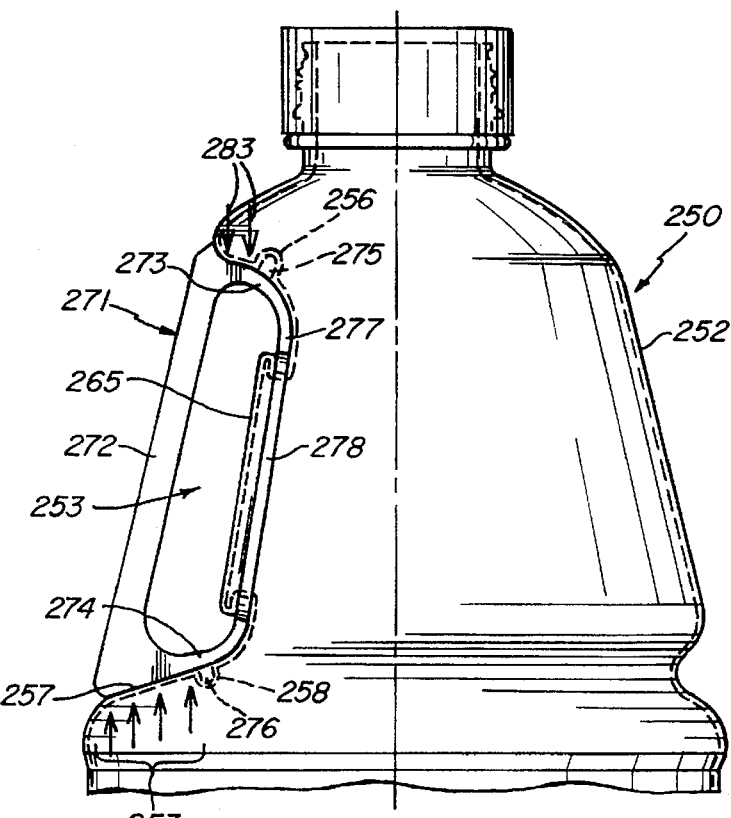
Fig. 21

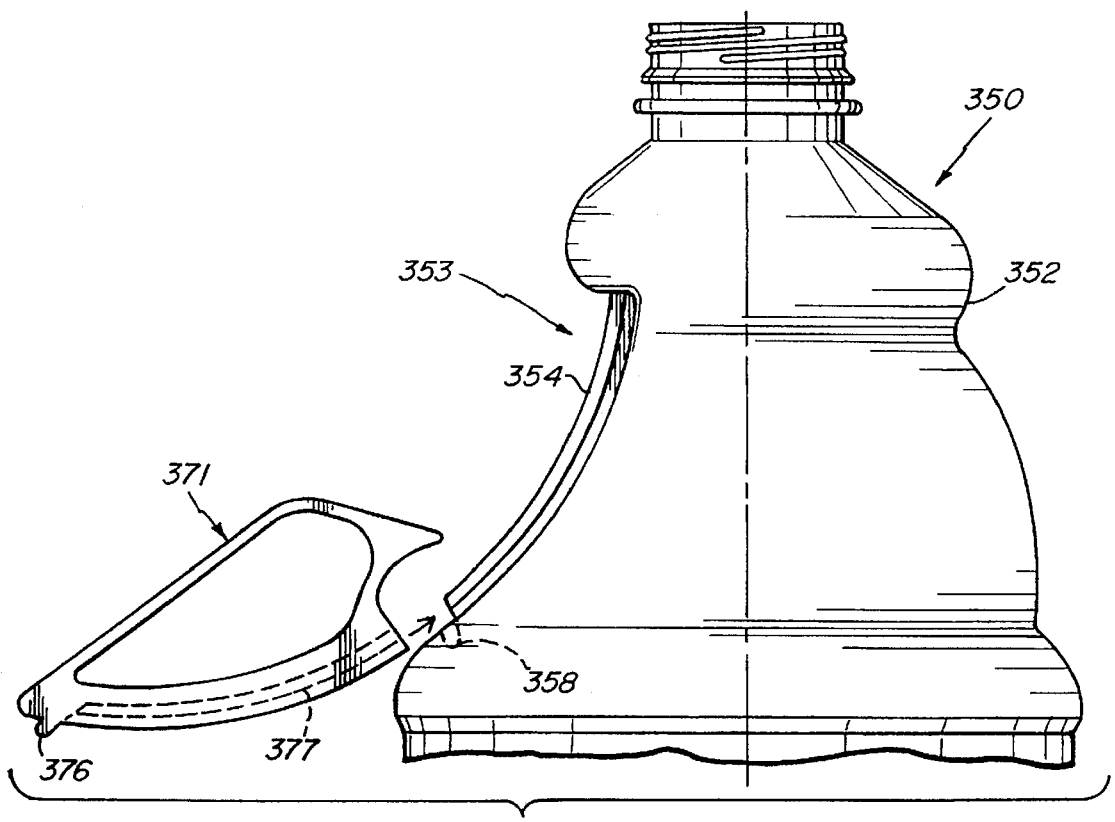
Fig. 24
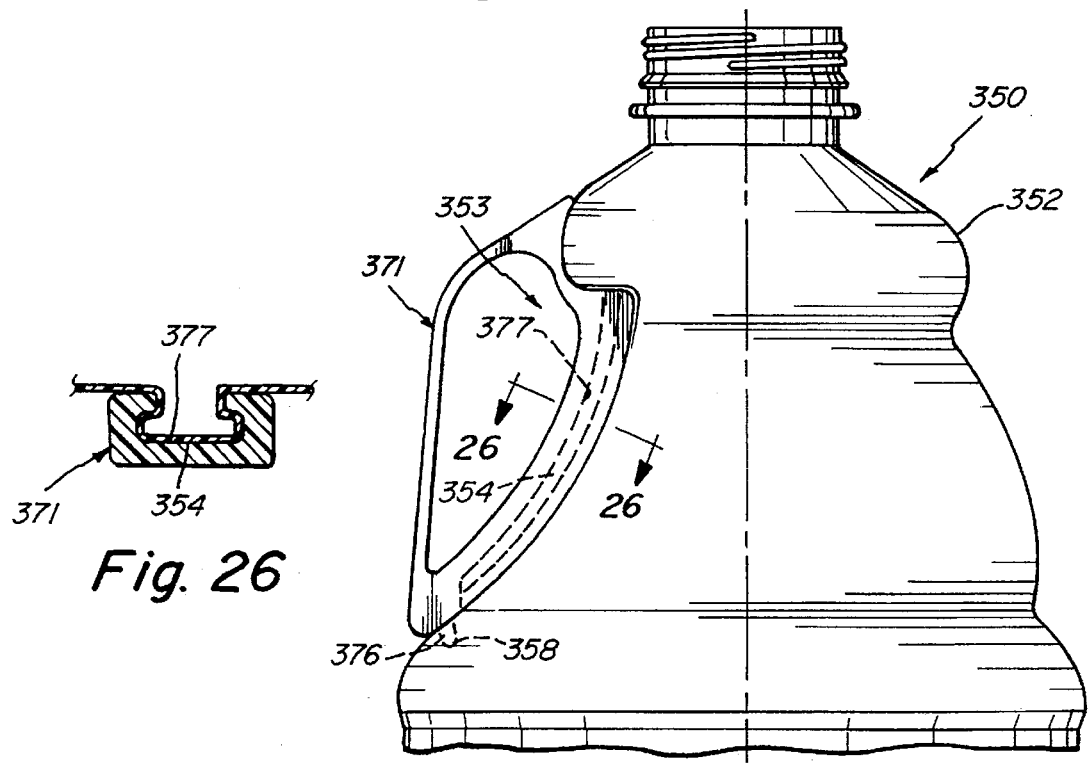
Fig. 26
Fig. 25

METHOD FOR POST-MOLD ATTACHMENT OF A HANDLE TO A STRAIN-ORIENTED PLASTIC CONTAINER

FIELD OF THE INVENTION

The present invention relates to a method for post-mold attachment of a handle to a strain-oriented plastic container, and more specifically to a method utilizing thermal shrinkage of the strain-oriented container body in order to secure engagement of the handle and container.

BACKGROUND OF THE INVENTION

Hot-fillable plastic containers are designed for the packaging of liquids (e.g., juice) which must be placed in the container while hot to provide for adequate sterilization. During filling, the container is subjected to elevated temperatures on the order of 180°–185° F. (the product temperature) and positive internal pressures on the order of 2–5 psi (the filler fluid pressure). The container is then capped and as the product cools, a negative internal pressure is formed in the sealed container.

Biaxially-oriented polyethylene terephthalate (PET) beverage bottles have been designed to receive a hot-fill product with controlled thermal shrinkage and minimum distortion. Such a bottle is described in U.S. Pat. No. 4,863,046 entitled "Hot Fill Container," which issued Sep. 5, 1989 to Collette et al. The Collette container is provided with a plurality of recessed vacuum panels in the middle panel section of the container, which reduce the magnitude of the vacuum generated in the sealed container to prevent any large uncontrolled geometric distortion. As the product cools, the vacuum panels deform and move inwardly in unison. A wrap-around label covers the vacuum panels and is supported by raised central wall portions in the vacuum panels, post areas between the vacuum panels, and horizontal glue land areas above and below the vacuum panels. Vertical recessed ribs may be provided in the post areas and within the vacuum panels to increase the longitudinal stiffness of the panel section.

Pasteurization is another method of sterilization which subjects a container to elevated temperatures and internal pressures. In this case, the container is filled with a cold (room temperature or below) liquid product, which may or may not be carbonated, the container is sealed, and then the sealed container is sent through a pasteurization chamber where both the product and container are subjected to an elevated equilibrium temperature (i.e., up to about 70°–75° C.) for a period of time (e.g., ten minutes) in order to effect sterilization. This lengthy exposure period at elevated temperatures generates high internal pressures due to fluid vaporization. After pasteurization, the container must be cooled without undergoing significant distortion or vacuum collapse.

A need exists to provide a thermal-resistant container, such as a hot-fill or pasteurizable container, with a handle to facilitate carrying and controlled pouring. This is especially true with larger-sized containers, e.g., 64-oz, 128-oz and larger, as the weight of the product and size of the container make it difficult for the user to handle the same. An integral handle is difficult to form with strain-hardenable materials, such as polyester. A separately-formed handle requires a secure attachment mechanism, especially with larger-sized (i.e., heavier) containers. And as always, to be commercially successful, a handled container must be capable of being manufactured at the lowest possible cost, which usually means minimum cycle time on high-production manufacturing equipment and a minimum number of additional manufacturing steps.

Numerous attempts have been made to accomplish in-mold attachment of a handle to a plastic container in a commercially viable manner. However, most of these attempts have not been successful because in-mold handle attachment involves: (a) more complex blow-molding equipment to enable insertion of a pre-made handle into a container blow mold at the correct position; (b) the added time for inserting the handle into the mold, which slows down the blowmolder throughput; and (c) the difficulty in blow-molding a complex handle-attaching shape, due to the strain-hardening characteristics of polyesters and other plastics. Thus, in-mold handle attachment has significant drawbacks.

Another difficulty with providing handles for thermal-resistant containers (e.g., hot fill or pasteurizable), whether done in-mold or post-mold, is that the high-temperature exposure may distort the container and/or handle such that there is no longer a secure engagement of the handle and container. Thus, there have been few attempts to commercialize a thermal-resistant container having a separate handle, especially in larger-sized containers.

A large-size (128-oz) hot-fillable juice container with a bale handle, sold by Ocean Spray Company, of Lakeland, Mass., is shown in FIGS. 1–2. This stretch blow-molded PET container 2 has a cylindrical sidewall panel 3 with six vacuum panels 4 disposed symmetrically about the circumference, to alleviate vacuum collapse. Rather than attempting to attach a handle to the container sidewall (which sidewall is subjected to increased pressure, thermal shrinkage, and vacuum collapse during the hot-fill process), a bale-type handle 5 is snap fit over a flange 6 adjacent the neck finish 7. The polyethylene handle 5 includes a ring portion 8 which can be stretched to enable its insertion over the neck flange 6 and subsequent release so as to be maintained under the flange. An extending "U"-shaped member 9 extends from the ring which is intended to be grasped by one hand of the user during carrying and pouring. It is necessary to use two hands during pouring, one attached to the bale and the other for lifting the base of the container. It is somewhat difficult to pour from this container into small cups, due to the large size and weight of the container. A small cup must normally be brought up close to the container opening 10, to prevent spillage. This difficulty with controlled pouring into small cups is partly due to the large container opening at the neck finish, which is necessitated by the stretch blow molding characteristics of polyethylene terephthalate (PET), i.e., in order to achieve the necessary level of axial and hoop expansion in the container, a preform having a relatively large opening is required for making this large-volume container. Thus, the present commercial hot-fillable container with a bale handle has a number of limitations.

SUMMARY OF THE INVENTION

The present invention is directed to a method of post-mold attachment of a handle to a plastic container. A strain-oriented plastic container body is molded having at least one integral handle-attaching recess. A separate handle is provided having a complimentary-shaped projection for insertion in the recess. Then, before, during or after filling of the container body with a product, the container body is exposed to an elevated temperature at a time and temperature sufficient to cause thermal shrinkage of the strain-oriented container body and handle-attaching recess, which shrinkage secures the engagement of the recess about the projection.

In one embodiment, a hot-fill polyester container body is stretch blow-molded from a preform in order to strain-orient the container sidewall. A large handle-receiving indentation is formed in the upper container sidewall, along with a pair of upper and lower opposed axial recesses aligned with the vertical axis of the container. The axial elongation and orientation of the container body ensures that there will be thermal shrinkage in the axial direction during later exposure to elevated temperatures.

A separate handle is provided which fits within the indentation in the container sidwall and includes opposed axial lugs to fit within the recesses. The handle is formed of a thermoplastic which softens when heated, to enable bending of the handle to facilitate insertion of the lugs into the recesses of the container body. Then, during hot-filling the heated container body first expands and then shrinks as it cools in an axial direction, generating a compressive force which holds the rigid handle and container body in engagement. This container may be used for making a large size (e.g., 128-oz) hot-fillable juice container. The handle enables controlled pouring with one hand.

Other embodiments utilizing alternative or additional members for handle attachment include: a dove tail boss; a neck ring; and/or a bubble molded into the container sidewall which can be softened (by heat) and compressed over a ring on the handle to secure the handle in place. Yet another embodiment utilizes a handle having studs which fit within post walls molded into the container sidewall, and which studs may include barbs or metal (for induction heating) to further secure the engagement. Induction heating of the studs and localized heating of the bubble (for compression about the ring) are both heating steps (for handle attachment) which occur prior to filling. Pasteurization is an example of a process wherein the heating step (for handle attachment) occurs after product filling. In various embodiments, the thermal shrinkage which secures the engagement may be in one or both of the hoop and axial directions. Also, an adhesive may be used to help secure the handle/container attachment. In addition, a pour spout may be attached to the neck finish of the container having a reduced area opening for improved pouring control.

These and other advantages of the present invention will be more particularly described in regard to the following description and drawings of select embodiments.

BRIEF DESCRIPTION OF THE DRAWINGS

FIG. 3 is a cross-sectional schematic view of a stretch blow-molding apparatus for making a strain-oriented container body with a pair of handle-attaching members, according to the present invention.

FIG. 3A is a fragmentary enlarged portion of the area of FIG. 3 encircled by arrows 3A, showing the lower molded recess.

FIG. 3B is a fragmentary enlarged portion similar to FIG. 3A but of an alternative embodiment wherein the blow-molded recess has been mechanically deepened by movable blades in the blow mold.

FIG. 4 is an exploded perspective view of a blow-molded container made according to a first embodiment of the invention, having integrally molded handle-attaching recesses in the container sidewall, and showing a handle to be attached to the same.

FIG. 5 is a fragmentary perspective view of the handle attachment area of FIG. 4 but with the handle snap-fit onto the container sidewall.

FIGS. 6–8 show a series of steps for attaching the handle according to the first embodiment; FIG. 6 shows the separate handle with the handle arm being heated; FIG. 7 shows the heated arm being bent to enable attachment; and FIG. 8 shows the handle attached to the container.

FIG. 9 is a partial side elevational view of the container of FIGS. 4–5, showing the hot-fill shrinkage forces securing engagement of the handle and container body.

FIG. 10 is a fragmentary exploded perspective view of a second embodiment, showing a molded container body and handle about to be attached.

FIG. 11 shows the handle snap-fit onto the container body in the second embodiment.

FIG. 12 shows the separate handle with the handle arm being heated; FIG. 13 shows the heated arm being bent to enable attachment; and FIG. 14 shows the handle attached to the container.

FIGS. 18–20 show a series of steps for attaching the handle to the bubble in the third embodiment; FIG. 18 shows the separate handle; FIG. 19 shows the handle ring placed around the bubble and a hot iron heating the bubble; and FIG. 20 shows the compressed bubble securing the handle on the container.

FIG. 21 shows the hot fill shrinkage forces securing engagement of the handle to the container.

FIG. 24 illustrates a method of assembly (fourth embodiment).

FIG. 25 is a side elevational view of the assembled handle and container (fourth embodiment).

FIG. 26 a cross-sectional view of the handle/dove tail boss connection taken along section lines 26—26 of FIG. 25.

FIG. 27 is a fragmentary exploded perspective view of the container and handle to be attached, and FIG. 28 is a fragmentary perspective view of the container with the attached handle.

FIG. 29 is a cross-sectional view taken along line 29—29 of FIG. 28 showing a stud inserted in a post-wall, and FIG. 30 shows the post-wall shrunk about the stud.

DETAILED DESCRIPTION

Figure 2:
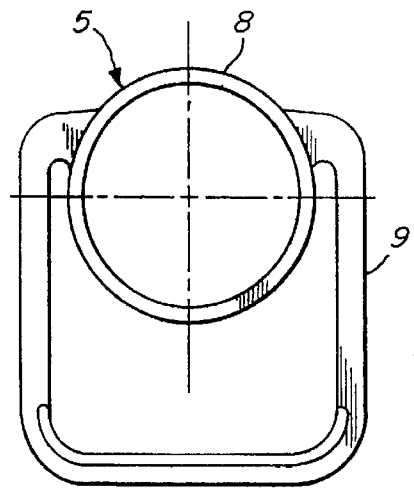
FIG. 2 is a top view of the bale handle of the prior art container of FIG. 1.
Figure 1:
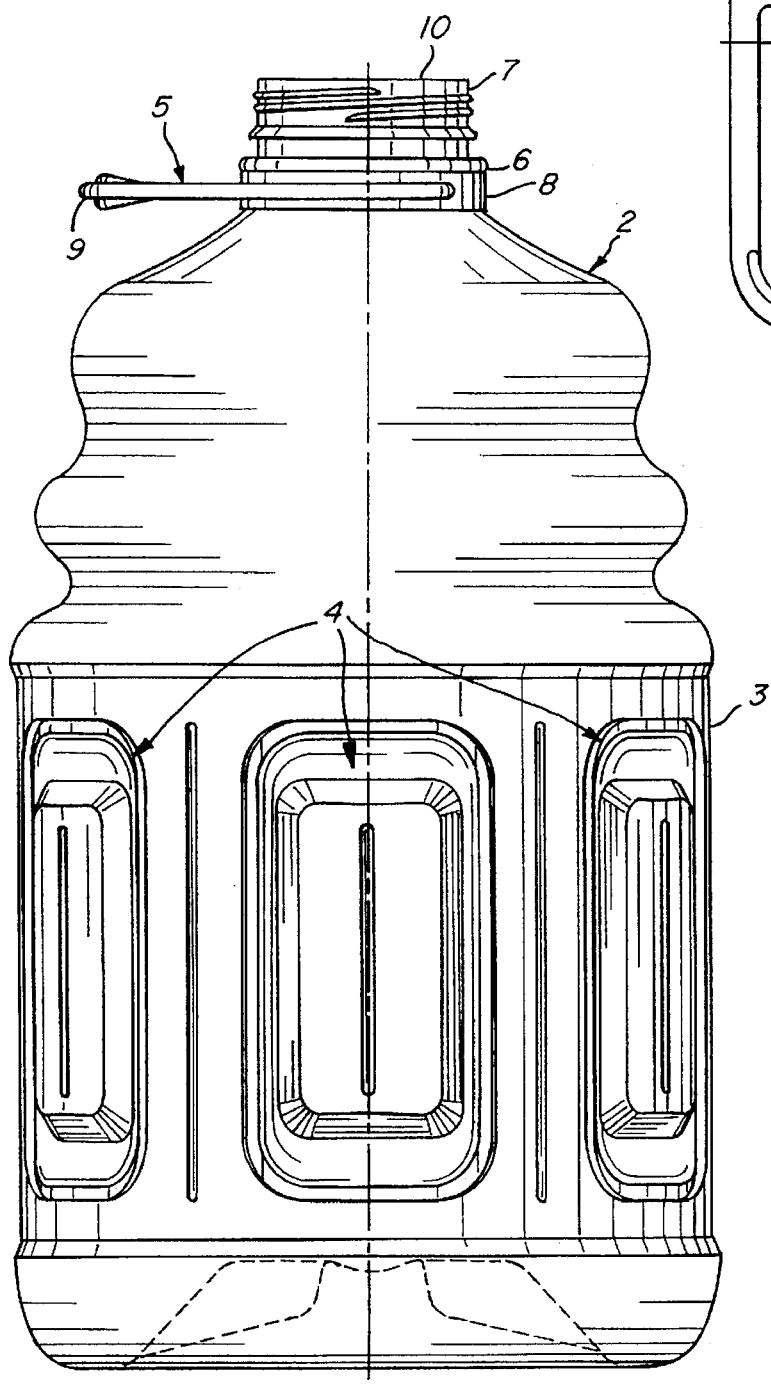
FIG. 1 is a front elevational view of a prior art hot-fillable juice container having a bale handle.

FIGS. 3–9 illustrate a method of making a container according to a first embodiment of the invention. The container is a 128-oz polyethylene terephthalate (PET) hot-fillable beverage bottle. The bottle (see FIG. 3) has an overall height A of about 320 mm, a panel section height B of about 125 mm, and a diameter C of about 155 mm. The thickness of the container at the panel section B is on the order of 0.6 mm.

As shown in FIG. 3, the bottle 50 is stretch blow-molded from an injection molded preform 21. The preform has an upper threaded neck finish 22 and a lower body-forming portion 23. The preform is heated to the glass transition temperature of the PET, and held in the stretch blow molding apparatus 30 by a collar 31 which engages the neck finish 22. A stretch rod 32 is inserted into the preform and axially elongated to impart axial orientation to the body-forming portion 23 of the preform below the neck finish. The axial extension at the panel section may be on the order of 2.7–2.9×. The tip 33 of the axial stretch rod holds the center of the extended preform base in position in the center of the blow mold 40, so that the preform is accurately centered during radial (hoop) expansion. Then, a fluid such as a gas (shown by arrows 41) is inserted into the interior of the preform to radially stretch the preform into engagement with the inner mold walls 42, whereby the preform assumes the shape of the blow mold cavity. The hoop extension at the panel section may be on the order of 3.2–3.8×. The planar stretch ratio at the panel section (i.e., the axial extension multiplied by the hoop extension) may be on the order of 8–12:1, and for a hot-fill PET container is preferably on the order of 9–10:1.

The container body 51 is formed with an upper flared shoulder 52 adjacent the unexpanded neck finish 22, the shoulder increasing in diameter in a direction away from the neck finish. However, one side of the shoulder is formed with a large indentation 53, projecting inwardly into the container body, which forms an area for handle attachment and enables insertion of the user's fingers between the handle and container body (see FIGS. 5 and 8). The shoulder includes a pair of axially-aligned upper and lower indents or recesses 56, 58 which form handle-attaching members as described hereinafter. The large indentation 53 includes a substantially vertical rear wall 54, a shortened horizontal upper wall 55 with upper recess 56, and a lengthened horizontal lower wall 57 with lower recess 58. Both recesses 56, 58 are formed adjacent the rear wall 54.

Below the shoulder 52, the container body 51 includes a substantially cylindrical panel section 59 (defined by vertical container axis 70) with six vacuum panels 60 symmetrically disposed about the panel section. The vacuum panels 60 each include a recessed, inwardly-concave portion 61 which is flexible to enable controlled contraction of the container when a vacuum is formed during cooling of the sealed hot-filled container. A central raised panel 62 includes a vertical reinforcing rib 63 for strength, to prevent buckling of the panel. In addition, vertical ribs 64 are provided in the post walls between the vacuum panels for stiffening. The base 65 of the container includes a standing ring 66 surrounding a central push-up dome 67, the central dome including a plurality of circumferentially-arranged panels to strengthen the base against inversion.

FIG. 4 again shows the as-molded container of the first embodiment and a handle about to be attached. The narrow radiused indents 56, 58 have undergone a fairly high level of strain orientation during radial and axial expansion of the preform, because of their relatively small radius of curvature. These inserts will thus have a relatively high level of orientation compared to other portions of the sidewall, which will produce a higher level of thermal shrinkage as described hereinafter.

In one embodiment shown in FIG. 3A, the indent or recess 58 has been stretch blow molded to a depth $d_1$ and width $w_1$ where the ratio $d_1:w_1$ is preferably at least on the order of 2:1 or greater. The bottom of the recess has a reduced thickness $t_2$ which is preferably at least on the order of 50% less than the wall thickness of the adjacent body portions $t_3$.

In a second embodiment shown in FIG. 3B, the blow molded recess is mechanically depressed by movable blades 401, 402 in the blow mold (see FIG. 3), wherein the ratio of the depth $d_2$ to width $w_2$ of the recess is preferably at least on the order of 3:1 or greater, and more preferably between 3:1 and 4:1.

In either of the embodiments shown in FIGS. 3A and 3B, where the panel section is oriented at a planar stretch ratio of about 10:1 for a hot-fill application, the recess is preferably oriented at a planar stretch ratio of at least on the order of 12:1 or greater, and more preferably at least 15:1. The bottom of the recess will be at least 50% thinner than the rest of the sidewall; thus, for a panel section of 0.018 inch (0.46 mm) thickness, the bottom of the recess will be on the order of 0.010–0.012 inch (0.25–0.31 mm) thickness. The depth of recess may be on the order of 0.20 inch to 0.40 inch (5–10 mm).

In order to provide the deep recesses (indents) in the container body as shown in FIG. 3B, the method and apparatus described in copending and commonly owned U.S. Ser. No. 08/160,963 to Collette et al., filed Dec. 2, 1993 and entitled "Method and Apparatus For Forming A Strain-Hardenable Plastic Container," may be used, and is hereby incorporated by reference in its entirety. In that application there is described a method of blow molding a preform made of a strain-hardenable thermoplastic material, wherein the blow mold has at least one extendable projection (see blades 401 and 402 in FIG. 3) to form a partial recess in the container as the material is blow molded over the projection, the depth of the partial recess being limited by the strain-hardening of the thermoplastic material during blow molding. Subsequent thereto, there is a mechanical extending of the depth of the partial recess by extending the projection further into the recess to form a deep handle-attaching recess. Then, the projection is mechanically retracted to allow removal of the container from the blow mold. A handle is subsequently attached to the container.

FIG. 5 shows a handle 71 attached to the container at indentation 53, according to the steps illustrated in FIGS. 6–8. The handle 71 is a separately injection-molded body preferably formed of a polyolefin. The handle includes a substantially vertical main arm 72, to be grasped by the user, and upper and lower horizontal extensions 73, 74 carrying a pair of axially-aligned recess-engaging members or lugs 75, 76. As shown in FIG. 6, the main arm 72 is heated by a heater 80. This softens the main arm and enables it to be bent, bringing the upper and lower extensions closer together to facilitate insertion of the upper and lower lugs 75, 76 into the upper and lower recesses 56, 58 of the container. As the handle cools, it becomes rigid and is now appropriately positioned on the container.

Then, as illustrated in FIG. 9, the container is filled with a hot liquid (see fill line 81) and immediately sealed with a cap 82. The hot liquid heats the container body 51 causing thermal expansion and then shrinkage during cooling of the strain-oriented body 51. The shrinkage is caused by relaxation of residual strain resulting from the blow molding operation. The axial shrinkage forces 83 which occur in the upper and lower recess walls 55, 57, particularly at the highly radiused and highly oriented upper and lower handle recesses 56, 58, cause the container body to shrink into closer engagement with the upper and lower handle extensions 73, 74 and lugs 75, 76. Once the container has cooled, the handle 71 is securely held by axial compressive forces within the container indentation 53, to enable one-handed pouring from the container. The recesses encapsulate and surround the lugs to prevent the handle from pulling out of the container.

FIGS. 10–15 show a second embodiment of the invention. Again, a 64-ounce PET container 150 is stretch blow-molded from a preform, as shown in FIG. 3. In this embodiment, the indentation 153 in the shoulder 152 is modified so as to eliminate the top recess wall. The indentation includes a substantially vertical rear wall 154 and a horizontal lower wall 157. A lower axial recess 158 is formed in the lower wall, adjacent the rear wall. Instead of providing an upper axial recess, a groove 156 is created under the flange 125, below the neck finish 122, which groove is formed during injection molding of the preform. The handle 171 has a main vertical arm 172, a lower extension 174 with an axial lug 176 for insertion in the lower recess 158, and an upper extension 173 with an upwardly extending projection 175 which can be snap fit into the groove 156 under the flange 125.

Figure 12:
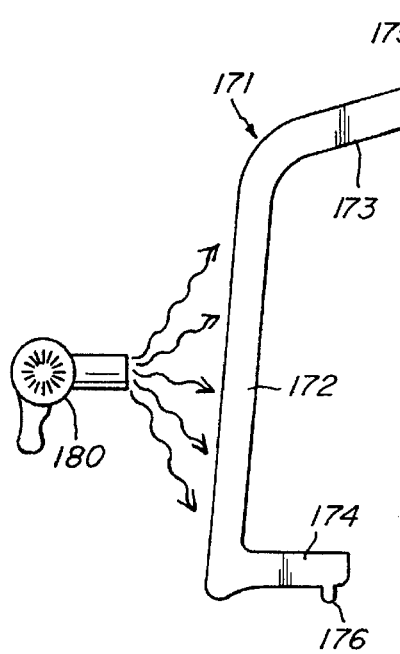
FIGS. 12–14 show a series of steps for attaching the handle to the container body according to the second embodiment.
Figure 13:
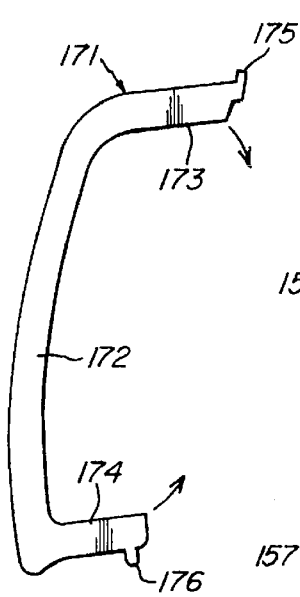
Figure 14:
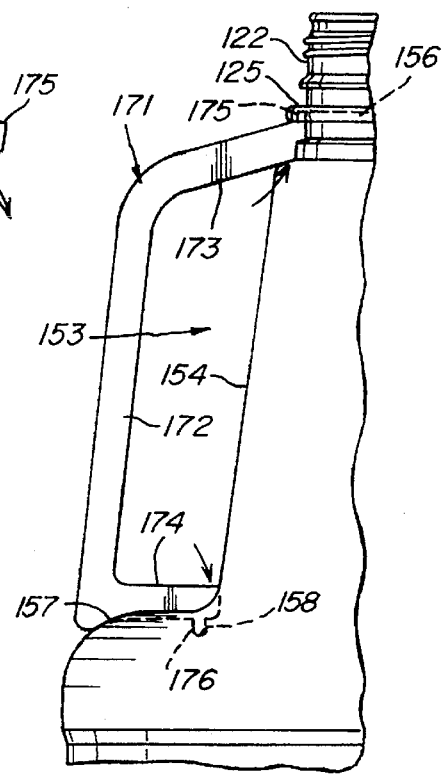

FIGS. 12–14 illustrate the steps for attachment of the handle to the container according to the second embodiment. Again, the main vertical arm 172 is heated to soften the same, the arm is bent to bring extensions 173 and 174 closer together and facilitate insertion of the upper projection 175 into the groove 156 and the lower lug 176 into the lower recess 158. As the handle cools, it again becomes rigid and secured in position.

Figure 15:
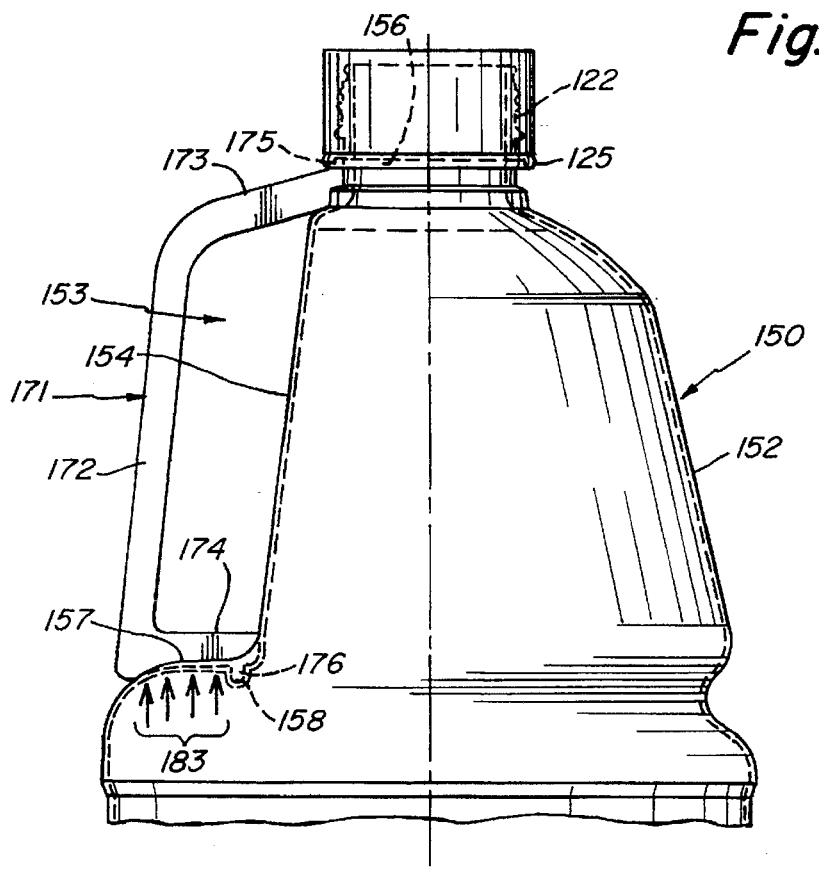
FIG. 15 shows the hot-fill shrinkage forces securing engagement of the handle and container in the second embodiment.

FIG. 15 shows the sealed hot-filled container 150 wherein the axial hot-fill shrinkage forces 183 secure the engagement (axial compression) of the lower recess wall 157 and lower handle extension 174, and lug 176 in recess 158. The upper handle attachment 175, which fits within groove 156, is not subjected to significant thermal shrinkage forces because the container neck finish is substantially unoriented and therefore does not shrink. Also, the neck finish 122 is a substantially thicker portion of the container, which increases the strength of the upper handle attachment.

Figure 16:
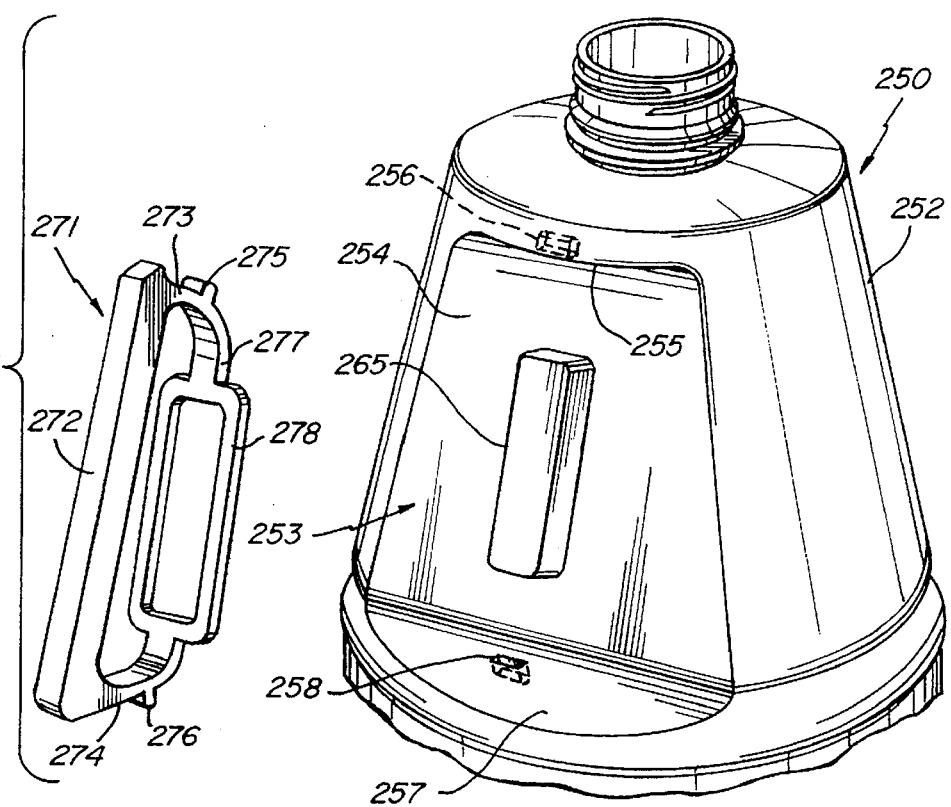
FIG. 16 is a fragmentary exploded perspective view of a third embodiment with a bubble molded into the container sidewall, and a handle about to be attached.
Figure 17:
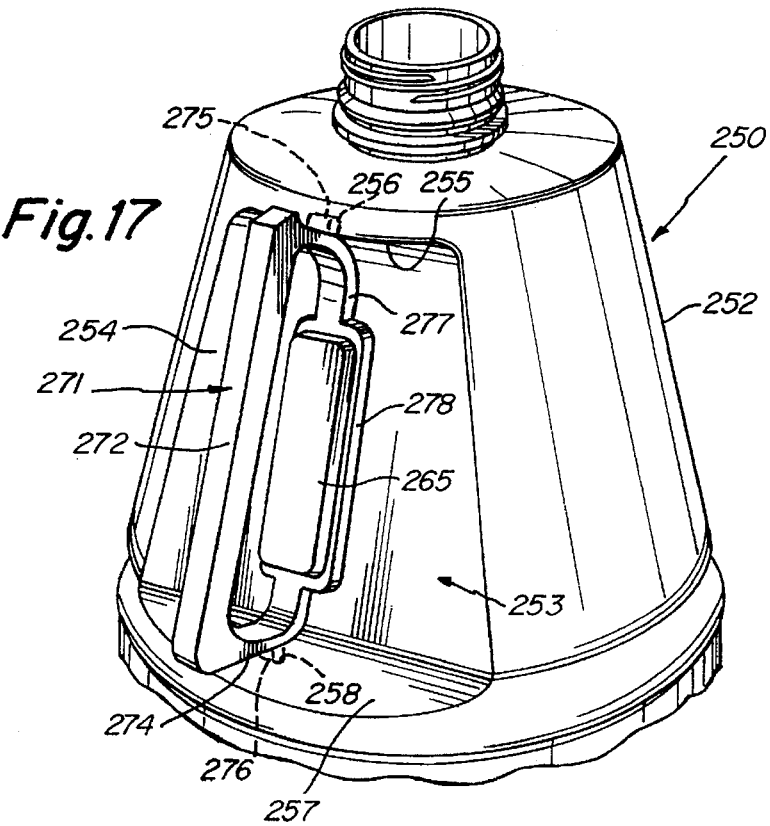
FIG. 17 shows the handle fit onto the container body in the third embodiment.
Figure 22:
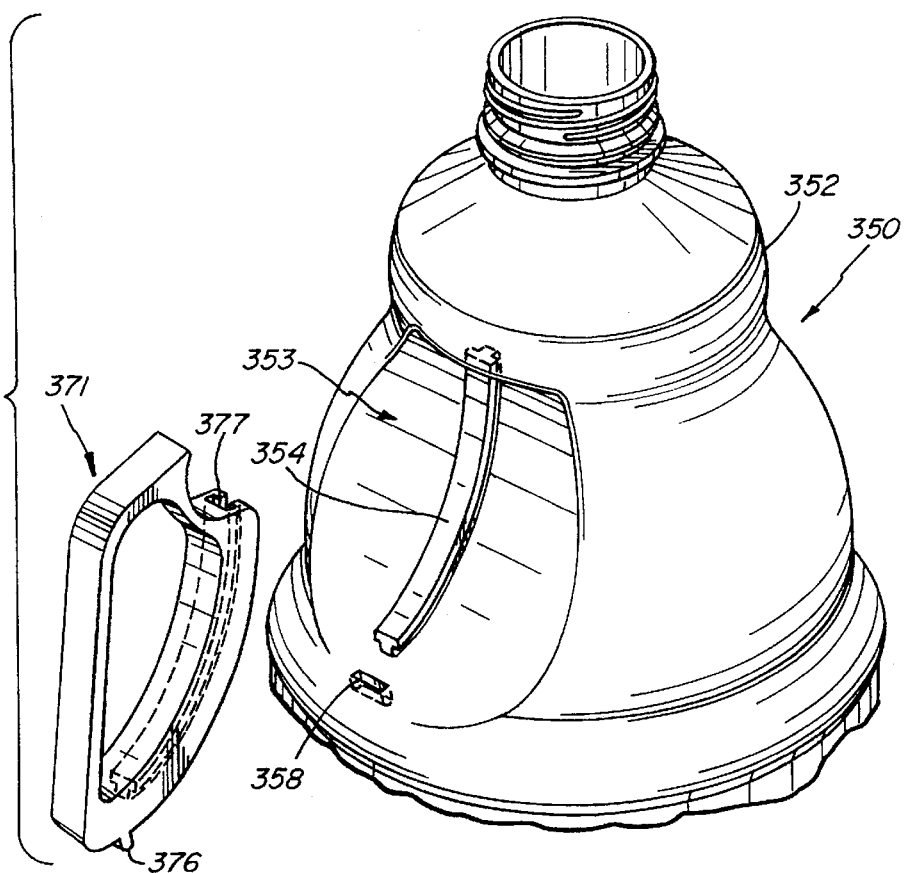
FIG. 22 is a fragmentary exploded perspective view of a molded container body having a dovetail boss and a handle to be attached thereto according to a fourth embodiment.
Figure 23:
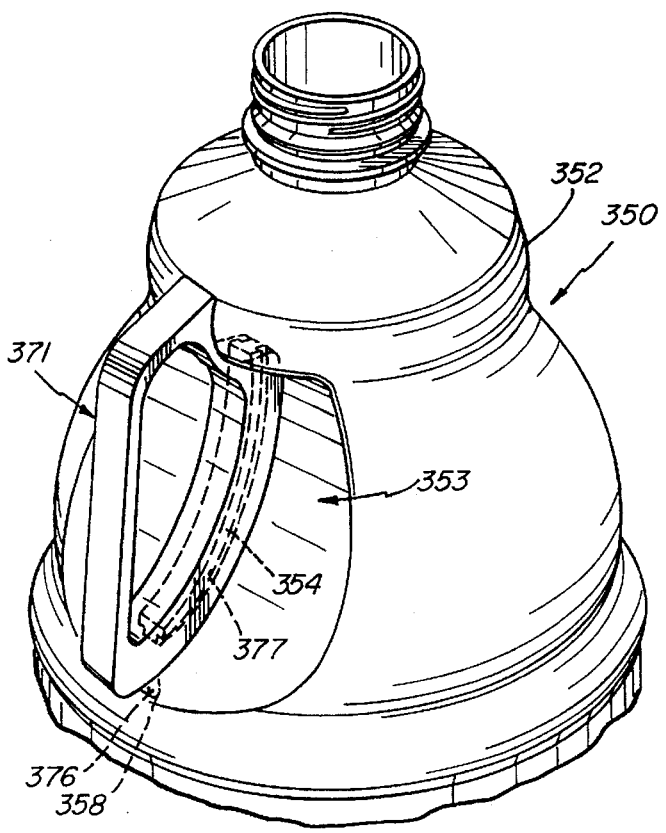
FIG. 23 is a perspective view of the container with the handle attached (fourth embodiment).

FIGS. 16–21 show a third embodiment of a PET hot-fill container 250, utilizing a bubble/ring handle attachment mechanism. FIG. 16 shows the container shoulder 252 having an indentation 253 similar to that in the first embodiment, with a rear wall 254 and upper and lower walls 255, 257 having upper and lower recesses 256, 258. In this case, an exteriorly extending bubble 265 is formed in the center of the rear wall 254. The bubble 265 has a substantially rectangular shape with rounded corners.

The handle 271 has a main vertical arm 272 and upper and lower extensions 273, 274; in this embodiment the upper and lower extensions are connected by a second vertical arm 277. The arm 277 includes a ring 278, which is substantially rectangular in shape and designed to fit around the bubble 265 on the container. As shown in FIGS. 18–20, the handle is positioned in the recess 253, with the ring 278 around the bubble 265, and the upper and lower lugs 275, 276 in the upper and lower recesses 256, 258. The bottle is preferably pressurized and the bubble is then heated, such as by applying a hot iron 280 against the bubble 265, to soften the same. The softened bubble is then compressed towards the interior of the container, causing the bubble to flare out and spread over the handle ring 278 in order to secure the ring to the container. Once cooled, the rigid handle will be locked to the container. Again, as shown in FIG. 21 thermal shrinkage forces 283 around the upper and lower walls 255, 257 and recesses 256, 258, will further secure the handle attachment.

In an alternative embodiment, the lugs and recesses are eliminated and the ring/bubble used to secure the handle and container.

FIGS. 22–25 show a fourth embodiment of a container 350 having a dovetail boss 354. The container shoulder 352 is formed with an outwardly concave indentation 353 having a sloped but substantially vertical dovetail boss 354 extending outwardly, as shown in cross section in FIG. 26. The handle has a complimentary cavity 377 adapted to be slid over the dovetail boss. The handle 371 includes a lower projection 376 which fits within an indent 358 at the lower end of the boss, to prevent the handle from backing off the boss. Again, thermal shrinkage forces will further secure the handle/container engagement.

Figure 27:
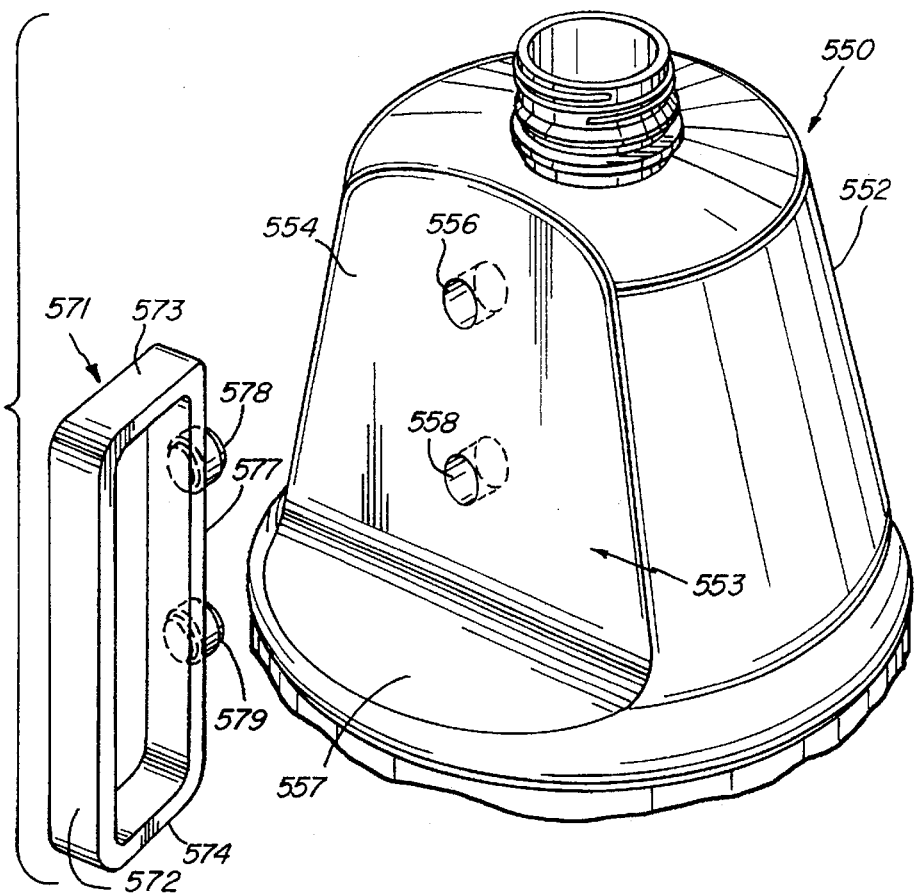
FIGS. 27–28 show a fifth embodiment wherein a handle has a pair of studs which fit in post-walls in the container sidewall.
Figure 28:
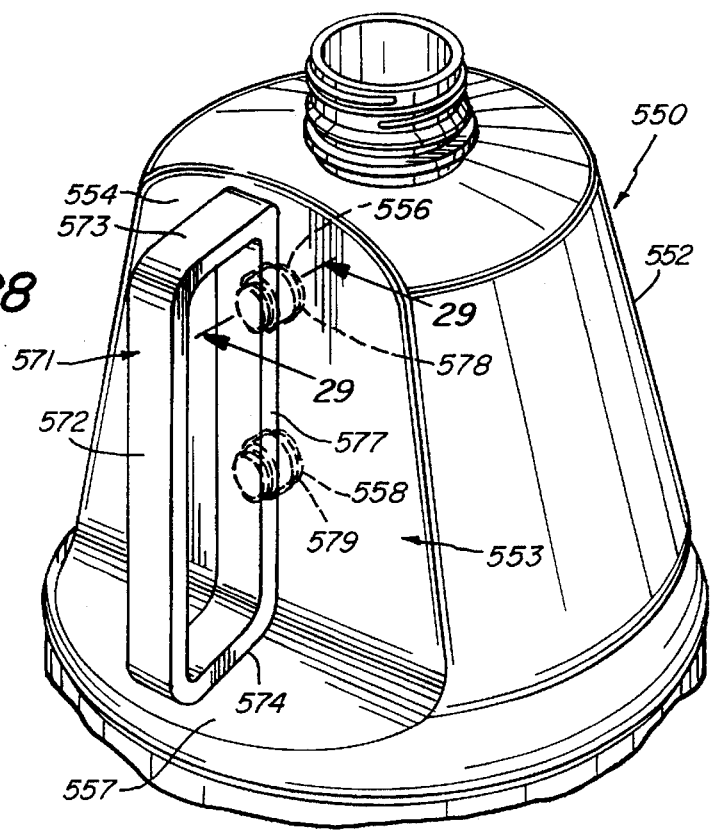

FIGS. 27–34 show a fifth embodiment of the invention, utilizing a stud/post wall engagement mechanism. FIG. 27 shows a container 550 with a shoulder 552 having an indentation 553 similar to that of the second embodiment, including a rear wall 554 and a lower wall 557. Formed in the rear wall are a pair of radially-aligned upper and lower post walls 556, 558 which project inwardly toward the vertical axis of the container. The handle 571 includes a main vertical arm 572, upper and lower transverse extensions 573, 574, and a second vertical arm 577 connecting the upper and lower extensions. The second arm 577 includes a pair of upper and lower radially-extending studs 578, 579, adapted to be fit within the post walls 556, 558, as shown in FIG. 28.

FIGS. 29–34 show three versions of the stud/post wall engagement.

Figure 29:
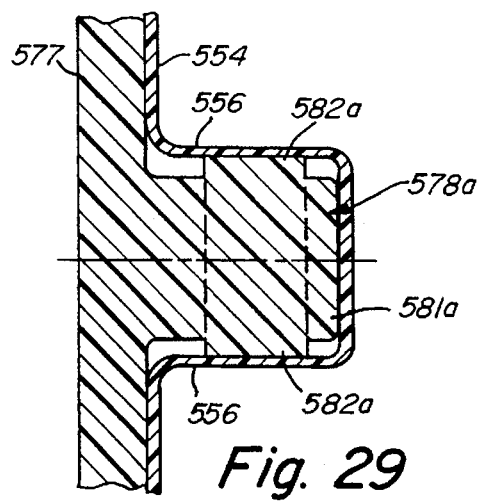
FIGS. 29–30 are cross-sectional views of one stud/post wall attachment mechanism.
Figure 30:
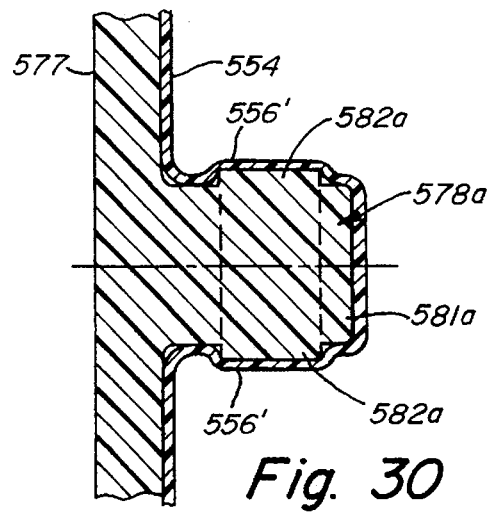

In a first version, shown in FIGS. 29–30, a stud 578a includes a cylindrical post member 581a of a first diameter having an enlarged circumferential ring or head portion 582a of a second diameter (larger than the first diameter) and which engages the circumferential post wall 556. During thermal shrinkage, the post wall 556 shrinks axially about the ring 582a (adopting shrunk position 556') to secure the handle engagement.

Figure 31:
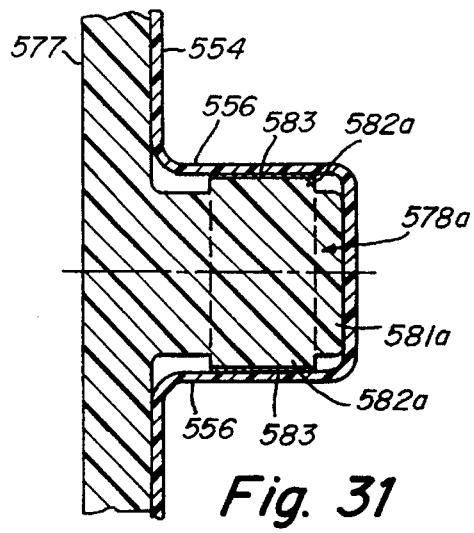
FIGS. 31–32 are cross-sectional views of a second stud/post wall attachment mechanism, FIG. 31 showing a stud with metal foil inserted into a post wall, and FIG. 32 showing the post-wall shrunk about the stud following induction heating.
Figure 32:
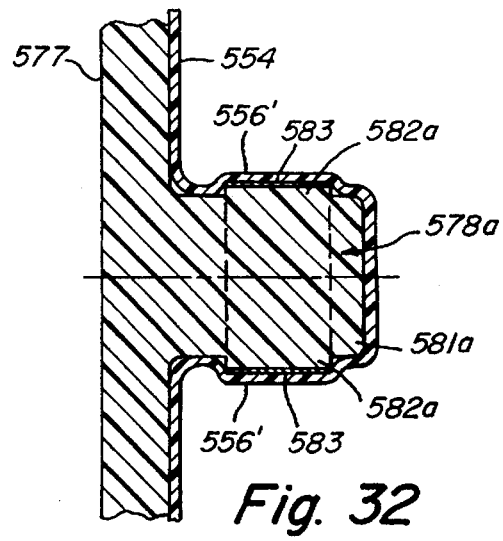

In a second version, shown in FIGS. 31–32, a layer of metal foil 583 is applied over the ring 582a, to enable induction heating of the post wall 556 to further secure the post wall about the stud 578a.

Figure 33:
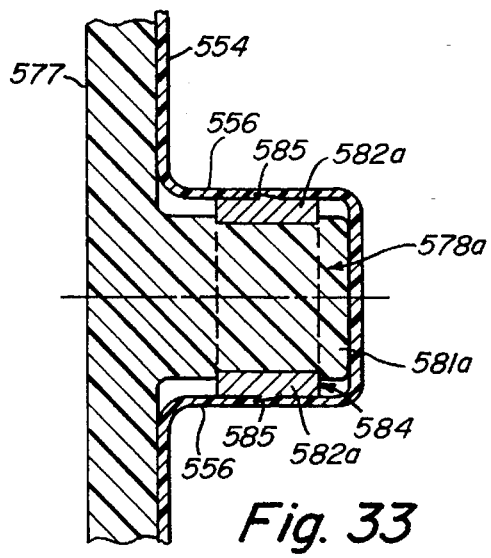
FIGS. 33–34 are cross-sectional views of a third stud/post-wall attachment mechanism, FIG. 33 showing a stud having a metal insert and barbs inserted into a post-wall, and FIG. 34 showing the post-wall shrunk about the stud, using both induction heating and mechanical engagement via the barbs.
Figure 34:
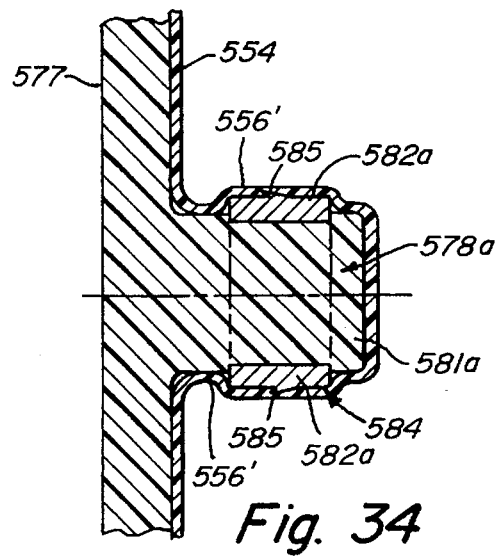

In a third version, shown in FIGS. 33–34, a metal insert 584 of spring steel forms the ring 582a on the stud 578a, and barbs 585 extend from the metal insert 584 to further secure the attachment between the stud and post wall 556.

Figure 35:
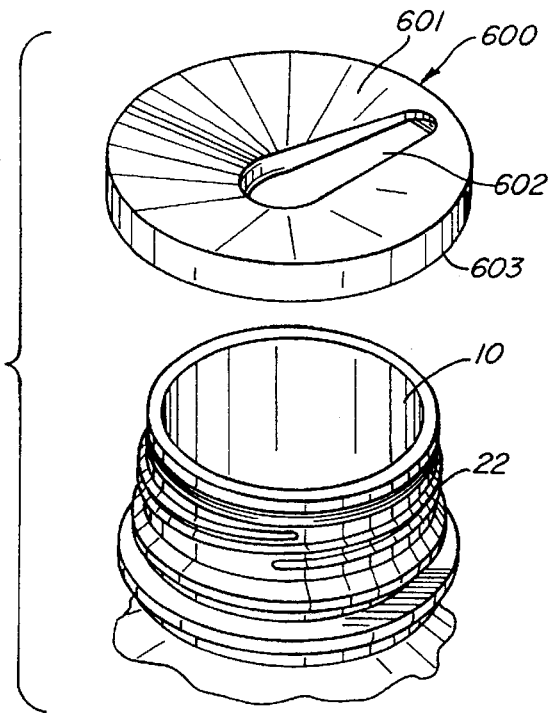
FIGS. 35–37 show a pour spout for attachment to a container neck finish, FIG. 35 being an exploded perspective view of the pour spout and container neck finish, FIG. 36 being a top plan view of the pour spout, and FIG. 37 being a cross-sectional view taken along line 37—37 of FIG. 36 of the pour spout attached to the neck finish.
Figure 36:
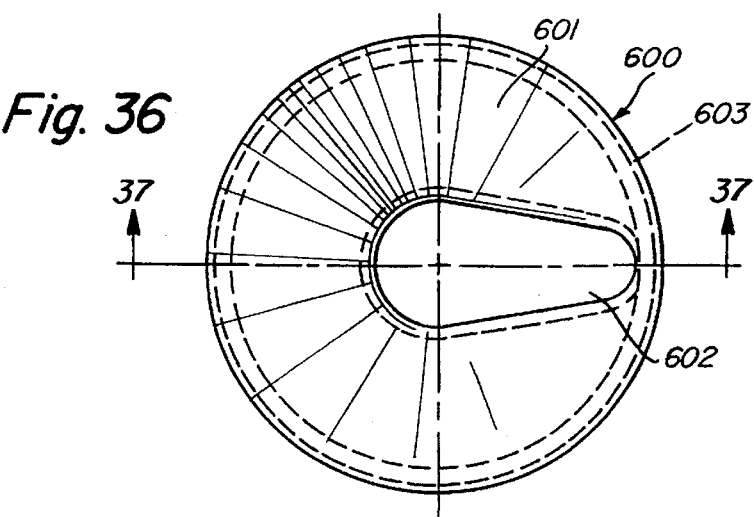
Figure 37:
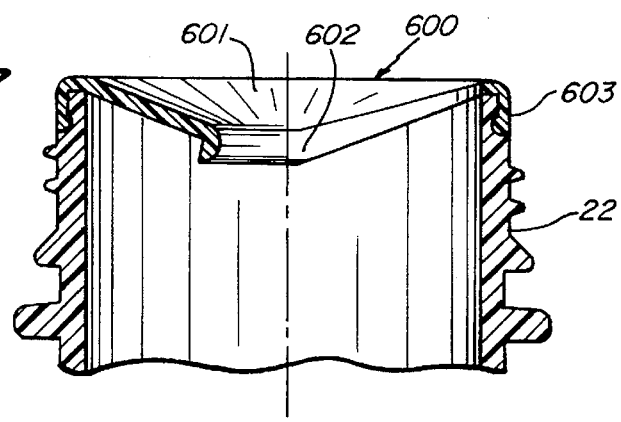

In any of the above embodiments, a pour spout 600 (see FIGS. 35–37) may be added to the neck finish 22 to further improve the pouring capability. The pour spout has an upper surface 601 with a reduced area opening 602 less than the opening 10 of the neck finish. A flange 603 extends downwardly from the upper wall for engaging the neck finish 22. The relatively narrow and elongated opening 602 of the pour spout facilitates controlled pouring from the relatively large opening 10 of the neck finish, especially for pouring into small cups.

The container may be made of any of the known polymer resins which provide good strength at an elevated temperature, such as polyesters, polyolefins, polycarbonates, nitriles, and copolymers of the above, as well as other high-temperature polymers.

Phthalic acid polyesters based on terephthalic or isophthalic acid are commercially available and convenient. The hydroxy compounds are typically ethylene glycol and 1,4-di-(hydroxymethyl)-cyclohexane. The intrinsic viscosity for phthalate polyesters are typically in the range of 0.6 to 1.2, and more particularly 0.7 to 1.0 (for O-chlorol-phenol solvent). 0.6 corresponds approximately to a viscosity average molecular weight of 59,000, and 1.2 to a viscosity average molecular weight of 112,000. In general, the phthalate polyester may include polymer linkages, side chains, and end groups not related to the formal precursors of a simple phthalate polyester. Conveniently, at least 90 mole percent will be terephthalic acid and at least 45 mole percent an aliphatic glycol or glycols, especially ethylene glycol.

Bottle grade polyethylene terephthalate(PET) homopolymers and copolymers are commercially available from Eastman Chemical Co. of Kingsport, Tenn.

Another useful polymer with physical properties similar to PET is polyethylene naphthalate (PEN). PEN provides a 3–5× improvement in oxygen barrier property (compared to PET), at some additional expense.

The container may be either a monolayer, or a multilayer construction, including layers of an oxygen barrier material such as ethylene vinyl alcohol or polyvinyledene chloride, and may include a layer of reprocessed scrap material, such as post-consumer or recycled PET.

Although certain embodiments of the invention have been specifically illustrated and described herein, it is to be understood that variations may be made without departing from the spirit and scope of the invention as defined by the appended claims.

We claim:

1. A method for post-mold attachment of a handle to a plastic container, comprising the steps of:
   blow molding a strain-oriented plastic container body with at least one integral handle-attaching recess in a mold, the recess having a higher level of orientation than adjacent portions of the body;
   removing the body from the mold;
   providing a separate handle having a projection and inserting the projection into the recess; and
   exposing the container body to an elevated temperature at a time and temperature sufficient to cause thermal shrinkage of the strain-oriented recess into close engagement with the projection in order to secure the handle to the container body.

2. The method of claim 1, wherein:
   the exposing step includes filling of the container body with a product and exposing the filled container body to the elevated temperature.

3. The method of claim 1, wherein:
   the exposing step comprises filling the container body with a heated liquid product.

4. The method of claim 2, wherein:
   the exposing step comprises pasteurization.

5. The method of claim 1, wherein:
   the container body is polyester and the recess is strain-oriented at a planar stretch ratio of at least 12:1.

6. The method of claim 5, wherein:
   the recess is strain-oriented at a planar stretch ratio of at least 15:1.

7. The method of claim 5, wherein:
   the container body is axially-stretched on the order of 2.7–2.9×.

8. The method of claim 5, wherein:
   the container body includes a panel section which is strain-oriented at a planar stretch ratio on the order of 9:1 to 11:1.

9. The method of claim 1, wherein:
   the strain orientation reduces the wall thickness of at least a portion of the recess by at least 50%.

10. The method of claim 1, wherein the container body has a vertical axis and:
    the at least one recess is aligned with the vertical axis; and
    the exposing step includes causing the at least one recess to undergo axial shrinkage in a direction parallel to the vertical axis.

11. The method of claim 10, wherein:
    the container body is molded with a pair of opposed axial recesses; and
    the exposing step includes causing the opposed axial recesses to undergo shrinkage along the vertical axis toward one another so as to apply a compressive force to the handle.

12. The method of claim 1, further comprising:
    mechanically deepening the molded recess.

13. The method of claim 1, wherein:
    the handle is bendable and the attaching step includes bending the handle in order to insert the projection into the recess.

14. The method of claim 1, wherein:
    the handle is formed of a thermoplastic material and during the attaching step, the handle is exposed to an elevated temperature which softens the thermoplastic material to facilitate insertion of the projection into the recess.

15. The method of claim 1, wherein the container body has an upper neck finish and a sidewall and:
    the method further comprises molding a preform having a neck finish and a groove adjacent the neck finish to form a first handle-attaching member; and
    the preform is blow molded into the container body and the recess is molded in the sidewall to form a second handle-attaching member.

16. The method of claim 1, wherein the container body has a sidewall and:
    the molding step includes forming a bubble projecting outwardly from the container body to form one handle-attaching member;
    the handle being provided with a ring shaped to surround the bubble; and
    the attaching step includes placing the ring around the bubble, exposing the bubble to an elevated temperature to soften the bubble, and compressing the softened bubble around the ring to secure the bubble and ring.

17. The method of claim 1, wherein:

the molding step includes forming a dovetail boss in the container body;

the handle being provided with a cavity slidable over the dovetail boss; and the attaching step including sliding the cavity over the dovetail boss.

18. The method of claim 17, wherein:

the molding step includes forming the recess adjacent the dovetail boss such that the projection and recess prevent the cavity from sliding off the dovetail boss.

19. The method of claim 1, wherein:

the molding step includes forming a pair of post walls;

the handle being provided with a pair of projections, each projection comprising a stem with an enlarged head portion adapted to fit within one of the post walls; and the exposing step including causing thermal shrinkage of the post walls about the enlarged head portions.

20. The method of claim 19, wherein:

the enlarged head portions are provided with metal; and the exposing step includes induction heating of the metal to cause thermal shrinkage of the post walls about the enlarged head portions.

21. The method of claim 19, wherein:

the projections are provided with barbs; and the exposing step includes shrinking the post walls about the barbs.

22. The method of claim 1, wherein:

the attaching step includes adhesively engaging the recess and projection.

23. The method of claim 1, wherein:

the molding step includes stretch blow molding a polyester container body.

24. The method of claim 1, wherein:

the molding step includes stretch blow molding a substantially polyethylene terephthalate (PET) container body.

25. The method of claim 1, further comprising:

during blow molding, forming the plastic container body with an integral bubble projecting outwardly from the container body to form a handle-attaching member;

the handle having a ring shaped to surround the bubble; and placing the ring around the bubble, exposing the bubble to an elevated temperature to soften the bubble, and compressing the softened bubble around the ring to secure the bubble and ring.

26. The method of claim 1, wherein the handle projection is provided with metal, and the exposing step includes induction heating of the metal to cause thermal shrinkage of the recess about the projection.

27. The method of claim 1, wherein the recess has a depth $d_1$ and width $w_1$ where the ratio $d_1:w_1$ is at least on the order of 2:1 or greater.

28. The method of claim 27, wherein the ratio $d_1:w_1$ is at least on the order of 3:1 or greater.

29. The method of claim 27, wherein the recess has a bottom wall having a reduced thickness $t_2$ on the order of at least 50% less than the wall thickness $t_3$ of body portions adjacent the recess.

30. The method of claim 29, wherein the container body is polyester.

31. The method of claim 30, wherein the polyester is substantially polyethylene terephthalate.

32. The method of claim 27, wherein the polyester is substantially polyethylene terephthalate and the recess is oriented at a planar stretch ratio of at least 12:1 or greater.

33. The method of claim 32, wherein the recess is oriented at a planar stretch ratio of at least 15:1 or greater.

34. The method of claim 32, wherein the container body has a panel section which is oriented at a planar stretch ratio on the order of 8–12:1.

35. The method of claim 34, wherein the panel section has a planar stretch ratio on the order of 9–10:1.

36. The method of claim 1, wherein the container body is substantially polyethylene terephthalate, the body has an upper shoulder portion having an indentation which forms an area for handle attachment and enables insertion of the user's fingers between the handle and container body, the indentation including a substantially vertical rear wall between upper and lower walls, and the at least one recess includes upper and lower recesses formed respectively in the upper and lower walls adjacent the rear wall, wherein each recess has a depth $d_1$ and width $w_1$ where the ratio $d_1:w_1$ is at least on the order of 2:1 or greater, and each recess has a bottom wall having a reduced thickness $t_2$ which is at least on the order of 50% less than a wall thickness $t_3$ of body portions adjacent the recess, the container body also having a panel section having a planar stretch ratio on the order of 9–10:1, and each recess being oriented at a planar stretch ratio of at least 12:1 or greater.

* * * * *